US012249448B2

(12) United States Patent
Eto et al.

(10) Patent No.: US 12,249,448 B2
(45) Date of Patent: Mar. 11, 2025

(54) RESISTOR AND MANUFACTURING METHOD OF RESISTOR

(71) Applicant: KOA Corporation, Nagano (JP)

(72) Inventors: Kohji Eto, Nagano (JP); Yohei Tokiwa, Nagano (JP); Reina Kaneko, Nagano (JP); Jumpei Yamamoto, Nagano (JP)

(73) Assignee: KOA Corporation, Nagano (JP)

( * ) Notice: Subject to any disclaimer, the term of this patent is extended or adjusted under 35 U.S.C. 154(b) by 348 days.

(21) Appl. No.: 17/759,506

(22) PCT Filed: Dec. 28, 2020

(86) PCT No.: PCT/JP2020/049195
§ 371 (c)(1),
(2) Date: Jul. 26, 2022

(87) PCT Pub. No.: WO2021/153152
PCT Pub. Date: Aug. 5, 2021

(65) Prior Publication Data

US 2023/0040165 A1 Feb. 9, 2023

(30) Foreign Application Priority Data

Jan. 27, 2020 (JP) ................................ 2020-011196

(51) Int. Cl.
*H01C 17/242* (2006.01)
*H01C 1/034* (2006.01)
(Continued)

(52) U.S. Cl.
CPC ........... *H01C 17/242* (2013.01); *H01C 1/034* (2013.01); *H01C 1/144* (2013.01); *H01C 17/28* (2013.01)

(58) Field of Classification Search
CPC ...... H01C 17/242; H01C 17/28; H01C 1/034; H01C 1/144
See application file for complete search history.

(56) References Cited

U.S. PATENT DOCUMENTS 8,325,005 B2 * 12/2012 Szwarc .................... H01C 1/14
338/307
9,076,576 B2 * 7/2015 Saito ...................... H01C 7/008
(Continued)

FOREIGN PATENT DOCUMENTS

JP 2002-075714 A 3/2002
JP 200471692 A 3/2004
(Continued)

OTHER PUBLICATIONS

International Search Report, Application No. PCT/JP2020/049195, mailed Mar. 2, 2021. ISA/Japan Patent Office.

*Primary Examiner* — Kyung S Lee
(74) *Attorney, Agent, or Firm* — Honigman LLP

(57) ABSTRACT

A resistor is provided with a resistance body and a pair of electrodes connected to the resistance body (a first electrode body, a second electrode body), the resistance body being arranged so as to be at least separated away from a substrate board (a circuit board) when mounted on the substrate board (the circuit board), wherein the resistor has the oxide film on at least one of the resistance body and each of the electrodes (the first electrode body, the second electrode body) at a boundary portion (a bonded portion, a bonded portion) between the resistance body and each of the electrodes (the first electrode body, the second electrode body) on the mounting surface of the resistor.

7 Claims, 14 Drawing Sheets

(51) Int. Cl.
*H01C 1/144* (2006.01)
*H01C 17/28* (2006.01)

(56) References Cited

U.S. PATENT DOCUMENTS

| | | | | |
|---|---|---|---|---|
| 9,384,876 | B2 * | 7/2016 | Tsukada | H01C 17/02 |
| 2014/0247108 | A1 | 9/2014 | Tsukada et al. | |
| 2023/0040165 | A1 * | 2/2023 | Eto | H01C 1/034 |

FOREIGN PATENT DOCUMENTS

| | | | |
|---|---|---|---|
| JP | 2009-071123 | A | 4/2009 |
| JP | 201389664 | A | 5/2013 |
| JP | 2015-065197 | A | 4/2015 |

* cited by examiner

RESISTOR AND MANUFACTURING METHOD OF RESISTOR

CROSS-REFERENCE TO RELATED APPLICATIONS

This application is the U.S. national stage of PCT/JP2020/049195 filed on Dec. 28, 2020, which claims priority of Japanese Patent Application No. JP 2020-011196 filed on Jan. 27, 2020, the contents of which are incorporated herein.

TECHNICAL FIELD

The present disclosure relates to a resistor, as well as to a manufacturing method of the resistor.

BACKGROUND

JP2009-071123A discloses, as a current sensing resistor, a resistor in which a pair of electrodes are welded to both end surfaces of a resistance body.

SUMMARY

With the resistor of a type as disclosed in JP2009-071123A, as a gap between the resistance body and a substrate board is reduced, solder creeps up to the resistance body along the electrodes in a reflowing step, and there is a risk in that deterioration of a sensing accuracy of current becomes significant. Of course, contact between the solder and the resistance body can be prevented by covering surfaces of the resistance body with resin. However, this will cause deterioration of a manufacturing yield and increase in manufacturing cost.

Thus, an object of the present disclosure is to provide a resistor capable of preventing a creeping of solder to a resistance body with a simple configuration, and to provide a manufacturing method of the resistor.

According to one aspect of the present disclosure, a resistor is provided with a resistance body and a pair of electrodes connected to the resistance body, the resistance body being arranged so as to be at least separated away from a substrate board when mounted on the substrate board, wherein the resistor has an oxide film on at least one of the resistance body and each of the electrodes at a boundary portion between the resistance body and each of the electrodes on a mounting surface of the resistor.

DETAILED DESCRIPTION OF PREFERRED EMBODIMENTS

Explanation of Resistor

Figure 1:
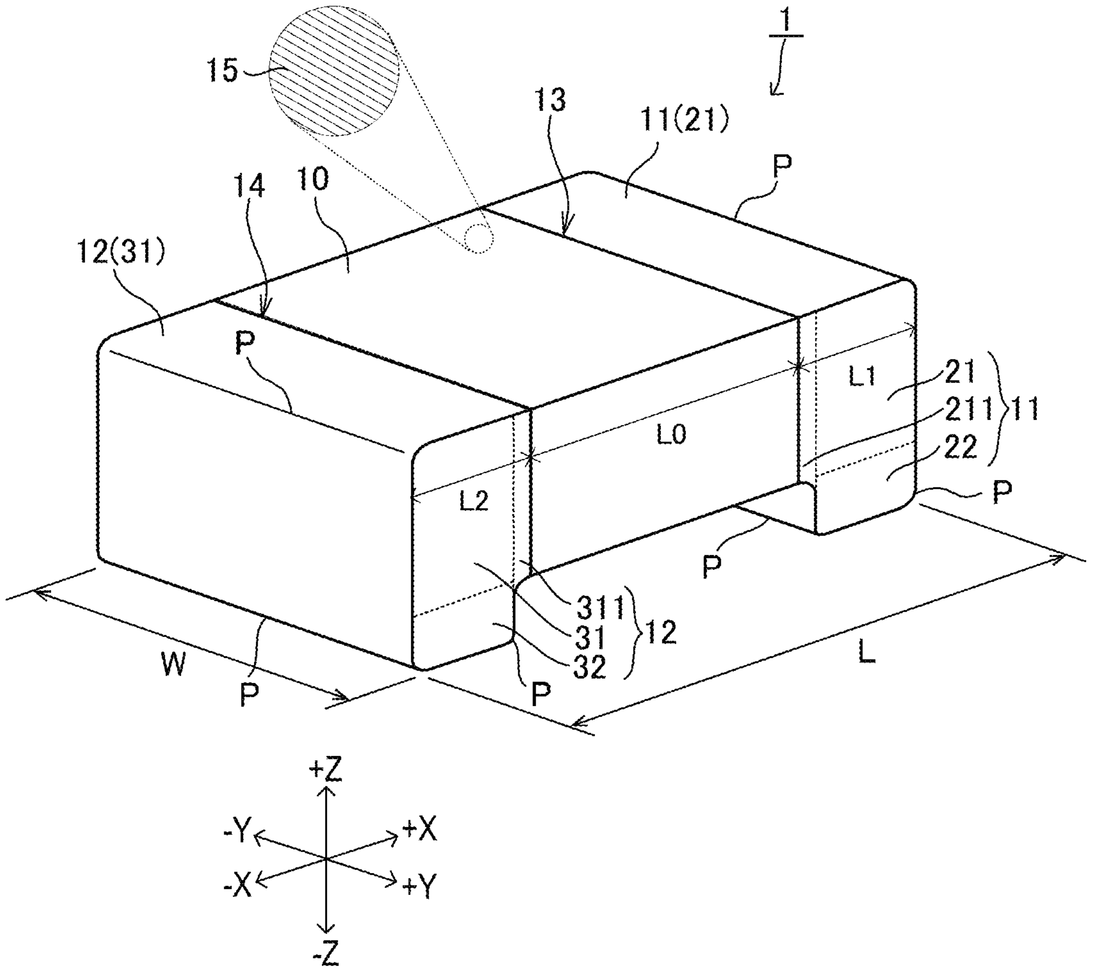
FIG. 1 is a perspective view of a resistor of the present embodiment.
Figure 2:
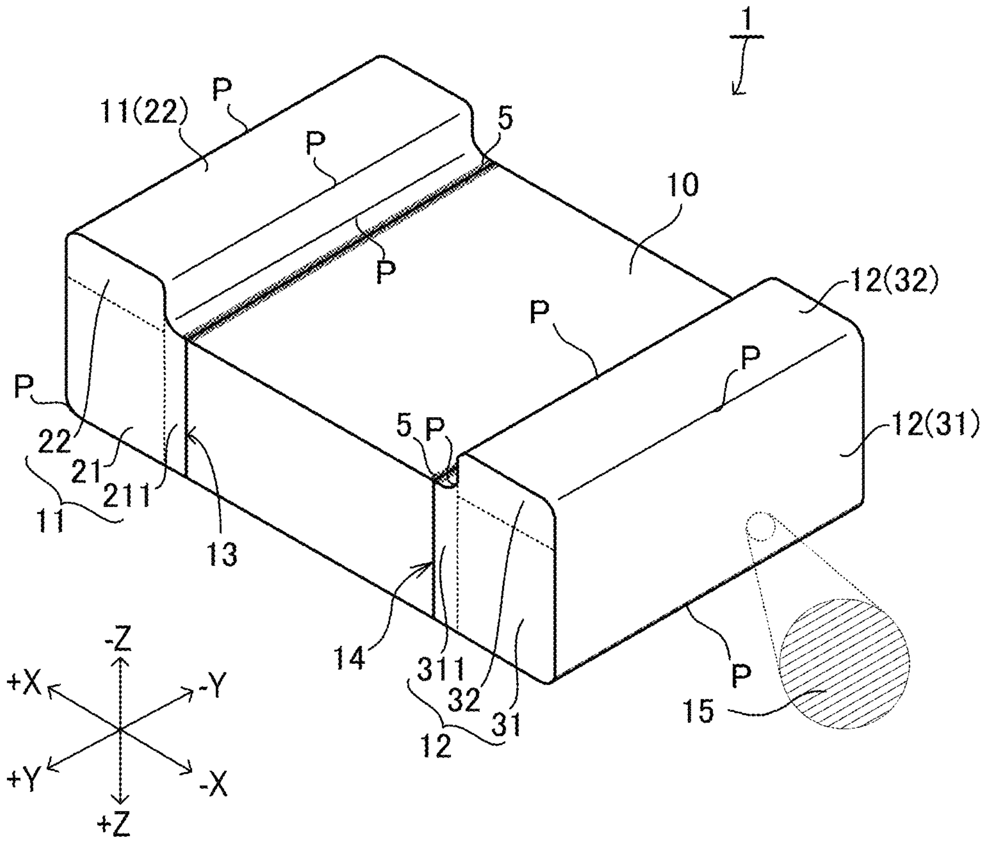
FIG. 2 is a perspective view of the resistor of the present embodiment viewed from the side of a mounting surface for a circuit board.

A resistor 1 of the present embodiment of the present disclosure will be described in detail with reference to FIGS. 1 and 2. FIG. 1 is a perspective view of the resistor 1 of the present embodiment. FIG. 2 is a perspective view of the resistor 1 of the present embodiment viewed from the side of a mounting surface for a circuit board.

The resistor 1 is provided with a resistance body 10, a first electrode body 11 (an electrode), and a second electrode body 12 (the electrode), and the resistor 1 is formed by bonding the first electrode body 11, the resistance body 10, and the second electrode body 12 in this order. The resistor 1 is mounted on the circuit board, etc., which is not shown in FIG. 1. For example, the resistor 1 is arranged on a pair of electrodes that are formed on a land pattern of the circuit board. In the present embodiment, the resistor 1 is used as a current sensing resistor (a shunt resistor).

In the present embodiment, the direction in which the first electrode body 11 and the second electrode body 12 are arranged (the longitudinal direction of the resistor 1) is referred to as the X direction (the direction towards the first electrode body 11 is referred to as the +X direction, and the direction towards the second electrode body 12 is referred to as the −X direction), the width direction of the resistor 1 is referred to as the Y direction (the front side with respect to the plane of FIG. 1 is referred to as the +Y direction, and the back side with respect to the plane of FIG. 1 is referred to as the −Y direction), and the thickness direction of the resistor 1 is referred to as the Z direction (the direction towards the circuit board is referred to as the −Z direction, and the direction away from the circuit board is referred to as the +Z direction). The X direction, the Y direction, and the Z direction are orthogonal with each other. In addition, the mounting surface of the resistor 1 means a surface of the resistor 1 that opposes to the circuit board when the resistor 1 is mounted on the circuit board, and the mounting surface includes respective surfaces of the first electrode body 11, the resistance body 10, and the second electrode body 12 that oppose to the circuit board.

In the present embodiment, the resistance body 10 is formed to have a cuboid shape (or a cube shape).

For the resistance body 10, it is possible to use materials having low to high resistances according to the application. In the present embodiment, from the view point of sensing a large current at a high accuracy, it is preferable that the resistance body 10 be formed of a resistance body material having a low specific resistance and a small temperature coefficient of resistance (TCR). As examples, a copper-manganese-nickel alloy, a copper-manganese-tin alloy, a nickel-chromium alloy, a copper-nickel alloy, and so forth can be used.

The first electrode body 11 is provided with a main body portion 21 that is bonded to the resistance body 10 and a leg portion 22 that is formed integrally with the main body portion 21 so as to extend towards the circuit board. In addition, the second electrode body 12 is provided with a main body portion 31 that is bonded to the resistance body 10 and a leg portion 32 that is formed integrally with the main body portion 31 so as to extend towards the circuit board.

The first electrode body 11 (the main body portion 21 and the leg portion 22) and the second electrode body 12 (the main body portion 31 and the leg portion 32) are preferably be formed of an electrically conductive material having a good electrical conductivity and thermal conductivity from the view point of ensuring a stable sensing accuracy. As one example, copper, a copper alloy, and so forth may be used as the first electrode body 11 and the second electrode body 12. An oxygen-free copper (C1020) may preferably be used as the copper. The same material can be used for the first electrode body 11 and the second electrode body 12.

The main body portion 21 of the first electrode body 11 has an end surface having substantially the same shape as an end surface of the resistance body 10 on the +X direction side, and the end surface of the main body portion 21 is bonded to the end surface of the resistance body 10 on the +X direction side so as to be abutted thereto. At a bonded portion 13 that is a boundary portion between the main body portion 21 and the resistance body 10, a boundary between the resistance body 10 and the main body portion 21 has no step and is flat, and so, the resistance body 10 and the main body portion 21 form a smooth continuous surface. In other words, a surface of the bonded portion 13 is formed so as to be flat over the entire circumference of the boundary between the resistance body 10 and the main body portion 21 (the state in which the step is not formed).

The main body portion 31 of the second electrode body 12 has an end surface having substantially the same shape as an end surface of the resistance body 10 on the −X direction side, and the end surface of the main body portion 31 is bonded to the end surface of the resistance body 10 on the −X direction side so as to be abutted thereto. At a bonded portion 14 that is the boundary portion between the main body portion 31 and the resistance body 10, the boundary of the resistance body 10 and the main body portion 31 has no step and is flat, and so, the resistance body 10 and the main body portion 31 form a smooth continuous surface. In other words, a surface of the bonded portion 14 is formed so as to be flat over the entire circumference of the boundary between the resistance body 10 and the main body portion 31 (the state in which the step is not formed).

The leg portion 22 is a member that extends towards the −Z direction from the mounting surface of the resistor 1, in other words, from the circuit board side of the main body portion 21. Although the length of the leg portion 22 in the X direction is shorter than that of the main body portion 21, a side surface of the leg portion 22 on the +X direction side forms the same flat surface with a side surface of the main body portion 21 on the +X direction side.

The leg portion 32 is a member that extends towards the −Z direction from the mounting surface of the resistor 1, in other words, from the circuit board side of the main body portion 31. Although the length of the leg portion 32 in the X direction is shorter than that of the main body portion 31, a side surface of the leg portion 32 on the −X direction side forms the same flat surface with a side surface of the main body portion 31 on the −X direction side.

In the present embodiment, the bonded portion 13 between the resistance body 10 and the first electrode body 11 and the bonded portion 14 between the resistance body 10 and the second electrode body 12 are each bonded by a cladding (a solid phase bonding). In other words, the bonded surfaces respectively form a diffusion bonded surface in which metal atoms in the resistance body 10 and the first electrode body 11 are mutually diffused and the diffusion bonded surface in which metal atoms in the resistance body 10 and the second electrode body 12 are mutually diffused.

The resistor 1 is mounted on the circuit board such that the leg portion 22 and the leg portion 32 project out towards the circuit board, and thereby, the resistance body 10 is mounted on the circuit board so as to be separated from the circuit board.

A portion of the main body portion 21 that is protruded towards the −X direction side is a protruded portion 211, and the protruded portion 211 is bonded to the resistance body 10. Similarly, a portion of the main body portion 31 that is protruded towards the +X direction side is a protruded portion 311, and the protruded portion 311 is bonded to the resistance body 10.

When the length L of the resistor 1 in the longitudinal direction (the X direction) (see FIG. 1) is set constant, by arbitrarily adjusting the length of the protruded portion 211 in the X direction (the length of the main body portion 21, see FIG. 1) or the length of the protruded portion 311 in the X direction (the length of the main body portion 31 in the X direction, see FIG. 1), it is possible to adjust the length L0 of the resistance body 10 in the X direction (see FIG. 1) so as to satisfy L0=L−(L1+L2). Therefore, it is possible to arbitrarily adjust the resistance value of the resistor 1 without changing the dimension L of the resistor 1 and without changing the shapes of the leg portions 22 and 32. Alternatively, even if the protruded amount of each the protruded portions 211 and 311 is increased without changing the dimension L of the resistor 1, the distance between the leg portion 22 and the leg portion 32 can be ensured, and so, it is possible to increase the degree of freedom for designing the resistor 1 while ensuring the distance between the land patterns.

In the above, the ratio of the length L0 of the resistance body 10 in the longitudinal direction of the resistance body 10 (the X direction), the length L1 of the first electrode body 11 in the X direction, and the length L2 of the second electrode body 12 in the X direction can be set arbitrarily. However, from the view point of reducing the resistance value while suppressing the increase in the TCR (the temperature coefficient of resistance [ppm/° C.]), it is preferable that the ratio be set so as to be L1:L0:L2=1:2:1 or about 1:2:1.

Furthermore, from the view point of increasing a heat radiation property and reducing the resistance value, it is preferable that the ratio of the length L0 of the resistance body 10 relative to the length L of the resistor 1 (=L1+L0+L2) be equal to or less than 50%.

In the present embodiment, the resistor 1 has, on its surface, stripe-patterned grooves and ridges 15 (see FIG. 1 (enlarged view) and FIG. 2 (enlarged view)). In this embodiment, the stripe-patterned grooves and ridges 15 are formed so as to extend along the Y direction on other side surfaces than the side surface facing the +Y direction and the side surface facing the −Y direction of the resistor 1.

The surface roughness caused by the groove portions and the ridge portions of the stripe-patterned grooves and ridges 15 can be about from 0.2 to 0.3 μm in terms of arithmetic average roughness (Ra).

In the present embodiment, the length L of the resistor 1 in the X direction is formed so as to be equal to or shorter than 3.2 mm. In addition, the resistance value of the resistor 1 is adjusted so as to be equal to or lower than 2 mΩ.

In this embodiment, from the view point of applying the resistor 1 to the high density circuit board, the length L of the resistor 1 in the X direction can be set equal to or shorter than 3.2 mm, and the length W of the resistor 1 in the Y direction (the width) can be set equal to or shorter than 1.6 mm (product standard 3216 size). Thus, as the size of the resistor 1 in this embodiment, the resistor 1 can also be applied to product standard 2012 size (L: 2.0 mm, W: 1.2 mm), product standard 1608 size (L: 1.6 mm, W: 0.8 mm), and product standard 1005 size (L: 1.0 mm, W: 0.5 mm). From the view point of achieving a handling property in a manufacturing method, which will be described below, for example, from the view point of preventing failure of a resistor base material 100 forming a base of the resistor 1 (see FIG. 14), the length L of the resistor 1 in this embodiment can be set to have the size equal to or larger than the above-described product standard 1005 size.

In this embodiment, from the view point of realizing the small size and the low resistance, it is possible to adjust the resistance value of the resistor 1 so as to be equal to or lower than 2 mΩ in any of the above-described sizes, and for example, it is possible to adjust the resistance value so as to be equal to or lower than 0.5 mΩ. In the above, the low resistance is a concept including the resistance value that is lower than the resistance value assumed from the dimension of a general resistor (for example, the resistor of the type disclosed in JP2002-57009A).

In this embodiment, all of corner portions P each serving as an edge side extending in the Y direction of the resistor 1 have chamfered shapes. In this embodiment, it is preferred that a radius of curvature of each corner portion P be set so as to be R=0.1 mm or less.

In addition, as shown in FIG. 2, oxide films 5 (5*a*, 5*b*, 5*c*, 5*d*) are respectively formed on the bonded portion 13 and the bonded portion 14 of the resistor 1 on the mounting surface side (this includes not only the mounting surface, but also a region near the mounting surface on the side surface of the resistor 1 facing the Y direction). This will be described below with reference to FIGS. 3 to 6.

Oxide Film 5

Figure 3:
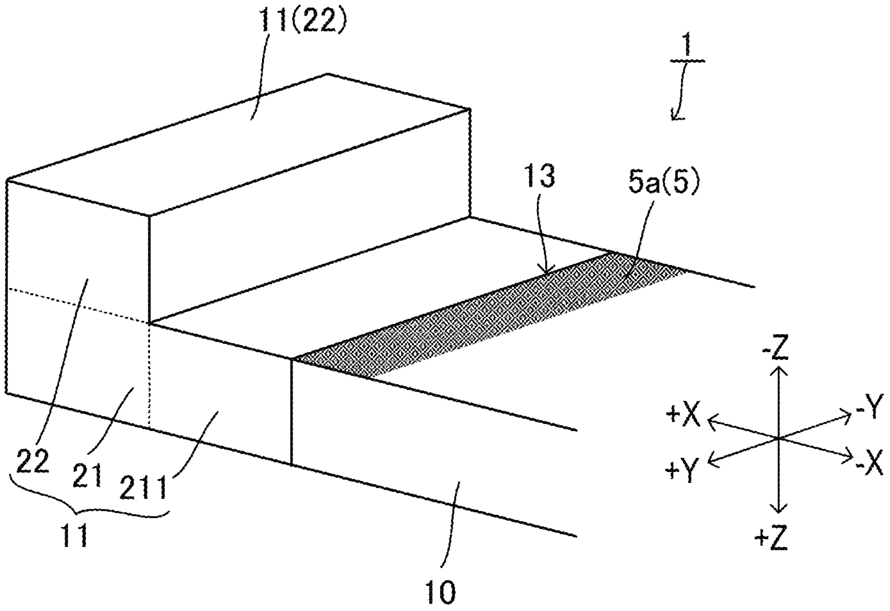
FIG. 3 is a diagram showing an oxide film formed on the resistor of the present embodiment.
Figure 4:
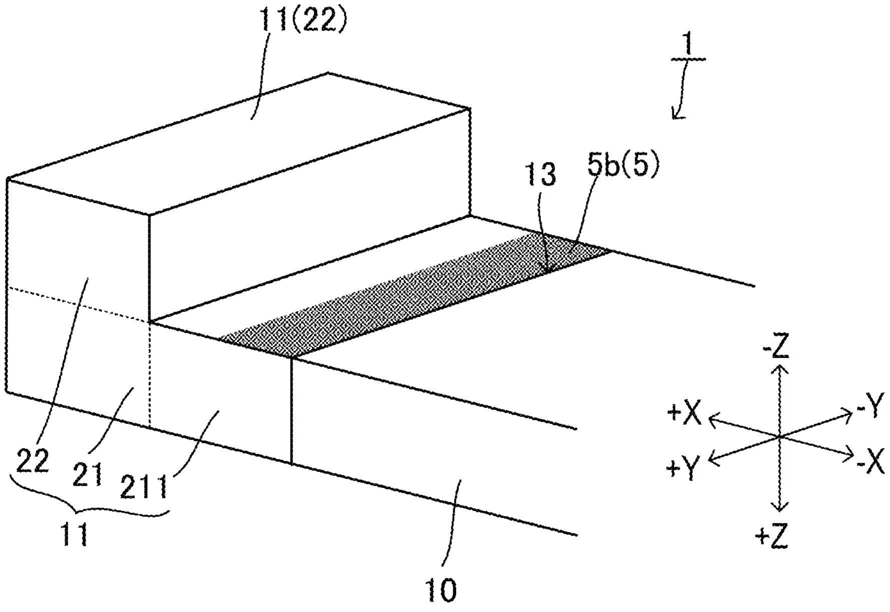
FIG. 4 is a diagram showing a first modification of the oxide film formed on the resistor of the present embodiment.
Figure 5:
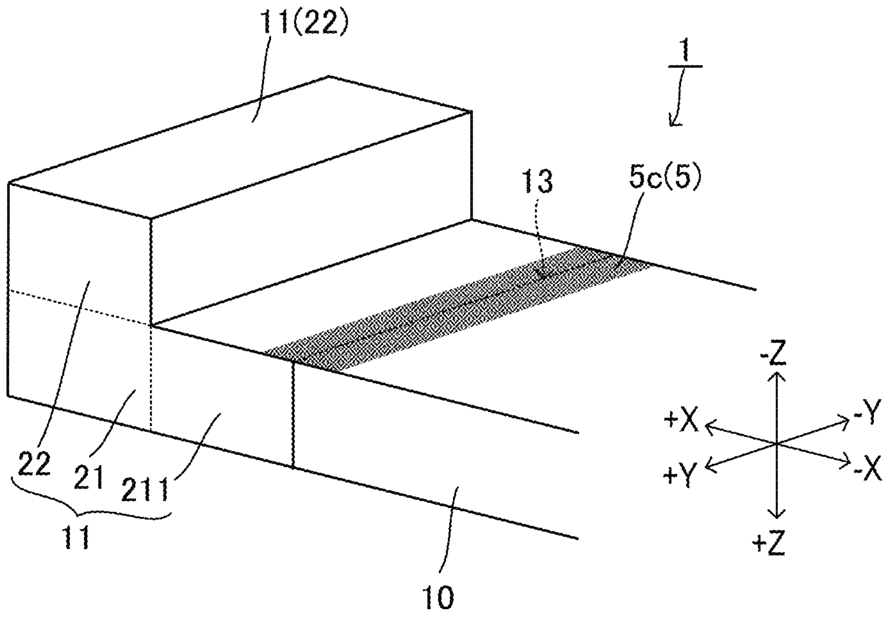
FIG. 5 is a diagram showing a second modification of the oxide film formed on the resistor of the present embodiment.
Figure 6:
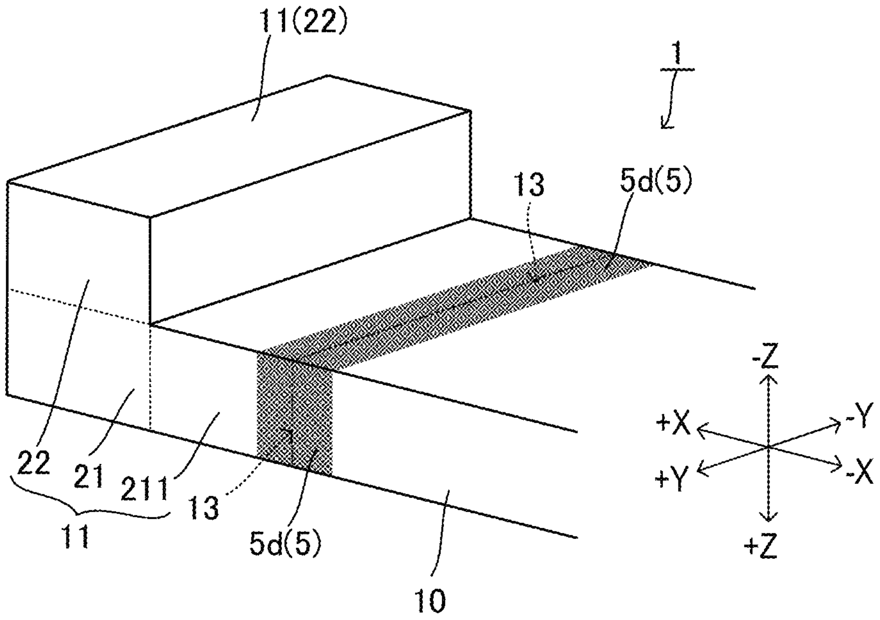
FIG. 6 is a diagram showing a third modification of the oxide film formed on the resistor of the present embodiment.

FIG. 3 is a diagram showing an oxide film 5 (5*a*) formed on the resistor 1 of the present embodiment. FIG. 4 is a diagram showing a first modification of the oxide film 5 (5*b*) formed on the resistor 1 of the present embodiment. FIG. 5 is a diagram showing a second modification of the oxide film 5 (5*c*) formed on the resistor 1 of the present embodiment. FIG. 6 is a diagram showing a third modification of the oxide film 5 (5*d*) formed on the resistor 1 of the present embodiment.

As shown in FIGS. 3 to 6, the oxide film 5 (5*a*, 5*b*, 5*c*, 5*d*) is formed on the mounting surface side of the resistor 1 of the present embodiment. The oxide film 5 (5*a*, 5*b*, 5*c*, 5*d*) is a thermal oxide film that is formed on a mounting-surface-side surface of any of the resistance body 10, the first electrode body 11, and the second electrode body 12 by heating it by irradiating laser.

In FIG. 3, on the mounting surface side of the resistor 1, the oxide film 5*a* (5) is formed on the resistance body 10 side of the bonded portion 13 between the resistance body 10 and the first electrode body 11 so as to have a predetermined width in the X direction and so as to extend over the entirety thereof in the Y direction. In addition, although illustration is omitted, on the mounting surface side of the resistor 1, the oxide film 5*a* (5) is formed on the resistance body 10 side of the bonded portion 14 between the resistance body 10 and the second electrode body 12 so as to have a predetermined width in the X direction and so as to extend over the entirety thereof in the Y direction.

In the first modification shown in FIG. 4, on the mounting surface side of the resistor 1, the oxide film 5*b* (5) is formed on the first electrode body 11 side of the bonded portion 13 between the resistance body 10 and the first electrode body 11 so as to have a predetermined width in the X direction and so as to extend over the entirety thereof in the Y direction. In addition, although illustration is omitted, on the mounting surface side of the resistor 1, the oxide film 5*b* (5) is formed on the second electrode body 12 side of the bonded portion 14 between the resistance body 10 and the second electrode body 12 so as to have a predetermined width in the X direction and so as to extend over the entirety thereof in the Y direction.

In the second modification shown in FIG. 5, on the mounting surface side of the resistor 1, the oxide film 5*c* (5) is formed so as to cover the bonded portion 13 between the resistance body 10 and the first electrode body 11, so as to have a predetermined width in the X direction, and so as to extend over the entirety thereof in the Y direction. In addition, although illustration is omitted, on the mounting surface side of the resistor 1, the oxide film 5*c* (5) is formed so as to cover the bonded portion 14 between the resistance body 10 and the second electrode body 12, so as to have a predetermined width in the X direction, and so as to extend over the entirety thereof in the Y direction.

The oxide film 5*d* (5) in the third modification shown in FIG. 6 is formed by extending the oxide film 5*c* (5) in the above-described second modification to the side surface of the resistor 1 (the surface facing the +Y direction and the surface facing the −Y direction). In addition, the oxide film 5*d* (5) may be formed so as to extend over the entire circumference of the bonded portion 13 and/or the bonded portion 14. The third modification may also be applied to the oxide film 5*a* (5) shown in FIG. 3 and the oxide film 5*b* (5) shown in FIG. 4.

A reason why the oxide film 5 (5*a*, 5*b*, 5*c*, 5*d*) is to be formed as described above will be described.

When the resistor 1 is mounted on the circuit board and a reflowing step is performed, the solder tends to creep up to the mounting surface side of the resistance body 10 along the leg portion 22 of the first electrode body 11 and along the leg portion 32 of the second electrode body 12. However, the oxide film 5 (5*a*, 5*b*, 5*c*, 5*d*) has a low wettability to the solder. Thus, even if the gap between the resistance body 10 and the circuit board is narrow, it is difficult for the solder to creep up on the oxide film 5 (5*a*, 5*b*, 5*c*, 5*d*). Therefore, it is possible to prevent the solder from creeping over the oxide film 5 (5*a*, 5*b*, 5*c*, 5*d*) and up to the resistance body 10.

By forming the oxide film 5*a* (5) as shown in FIG. 3, it is possible to prevent further creeping of the solder at the edge side of the oxide film 5*a* (5) on the leg portion 22 side, in other words, at a position where the protruded portion 211 of the first electrode body 11 overlaps with the bonded portion 13. In addition, although illustration is omitted, it is possible to prevent further creeping of the solder at the edge side of the oxide film 5*a* (5) on the leg portion 32 side, in other words, at a position where the protruded portion 311 of the second electrode body 12 overlaps with the bonded portion 14.

By forming the oxide film 5*b*, 5*c*, 5*d* (5) as shown in FIGS. 4, 5, and 6, it is possible to prevent further creeping of the solder at the edge side of the oxide film 5*b*, 5*c*, 5*d* (5) on the leg portion 22 side, in other words, at a position on the leg portion 22 side of the protruded portion 211 of the first electrode body 11 that is an intermediate position to which the solder has moved in the −X direction. In addition, although illustration is omitted, it is possible to prevent further creeping of the solder at the edge side of the oxide film 5*b*, 5*c*, 5*d* (5) on the leg portion 32 side, in other words, at a position on the main body portion 31 that is an intermediate position to which the solder has moved in the +X direction from a position of a joint of the leg portion 32.

In the arrangement of the oxide film 5*a* (5) shown in FIG. 3, the creeping of the solder reaches the bonding position of the first electrode body 11 with the resistance body 10 on the mounting surface (the bonded portion 13) and reaches the bonding position of the second electrode body 12 with the resistance body 10 on the mounting surface (the bonded portion 14). Thus, temperature variation of the TCR of the first electrode body 11 and the second electrode body 12 can be compensated more effectively compared with the arrangement of the oxide film 5*b*, 5*c*, 5*d* (5) respectively shown in FIG. 4 to FIG. 6.

Figure 7:
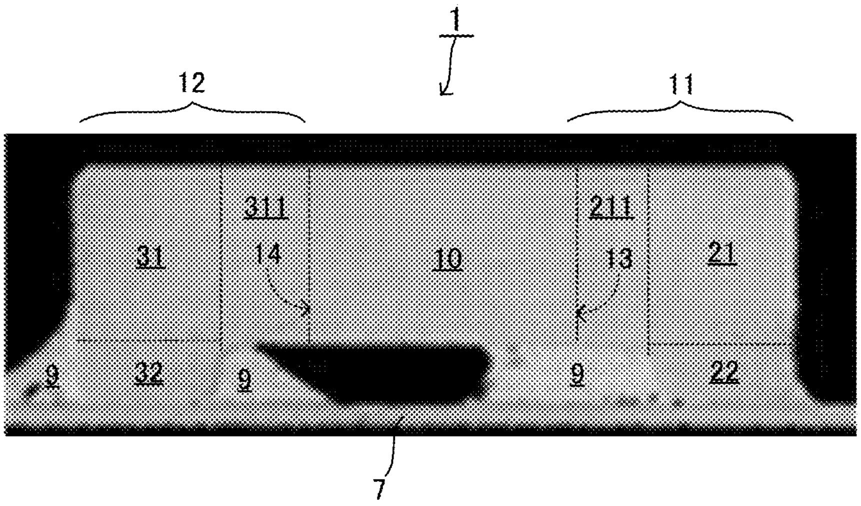
FIG. 7 is a sectional photograph in which the resistor of the present embodiment is mounted by using solder.

FIG. 7 is a sectional photograph in which the resistor 1 of the present embodiment is mounted by using the solder. Similarly to the case described above, the resistor 1 shown in FIG. 7 is formed by performing the cladding by abutting the end surface of the resistance body 10 with the end surface of the first electrode body 11 and by abutting the end surface of the resistance body 10 with the end surface of the second electrode body 12. In the above, on the mounting surface side of the resistor 1, although the oxide film 5 (see FIG. 2, etc.) is formed on the boundary portion extending over the bonded portion 14 between the second electrode body 12 and the resistance body 10, the oxide film 5 is not formed on the boundary portion extending over the bonded portion 13 between the first electrode body 11 and the resistance body 10.

By performing the reflowing step, the resistor 1 was mounted on the circuit board 7 via a solder 9. As a result, the solder 9 that came into contact with the leg portion 22 of the first electrode body 11 shown on the right side creeped up the leg portion 22 and also creeped up to the resistance body 10 via the protruded portion 211 on the mounting surface, thereby coming into contact with the resistance body 10. On the other hand, although the solder 9 that came into contact with the leg portion 32 of the second electrode body 12 creeped up the leg portion 32 and also creeped up to the protruded portion 311 on the mounting surface, the creeping of the solder 9 was prevented at the position where the solder 9 came into contact with the oxide film 5. Therefore, in actual resistor 1, the oxide films 5 are respectively formed on the boundary portion extending over the bonded portion 14 between the second electrode body 12 and the resistance body 10 and formed on the boundary portion extending over the bonded portion 13 between the first electrode body 11 and the resistance body 10. With such a configuration, it is possible to easily understand that the creeping of the solder 9 up to the resistance body 10 can be prevented.

Trimming

Figure 8:
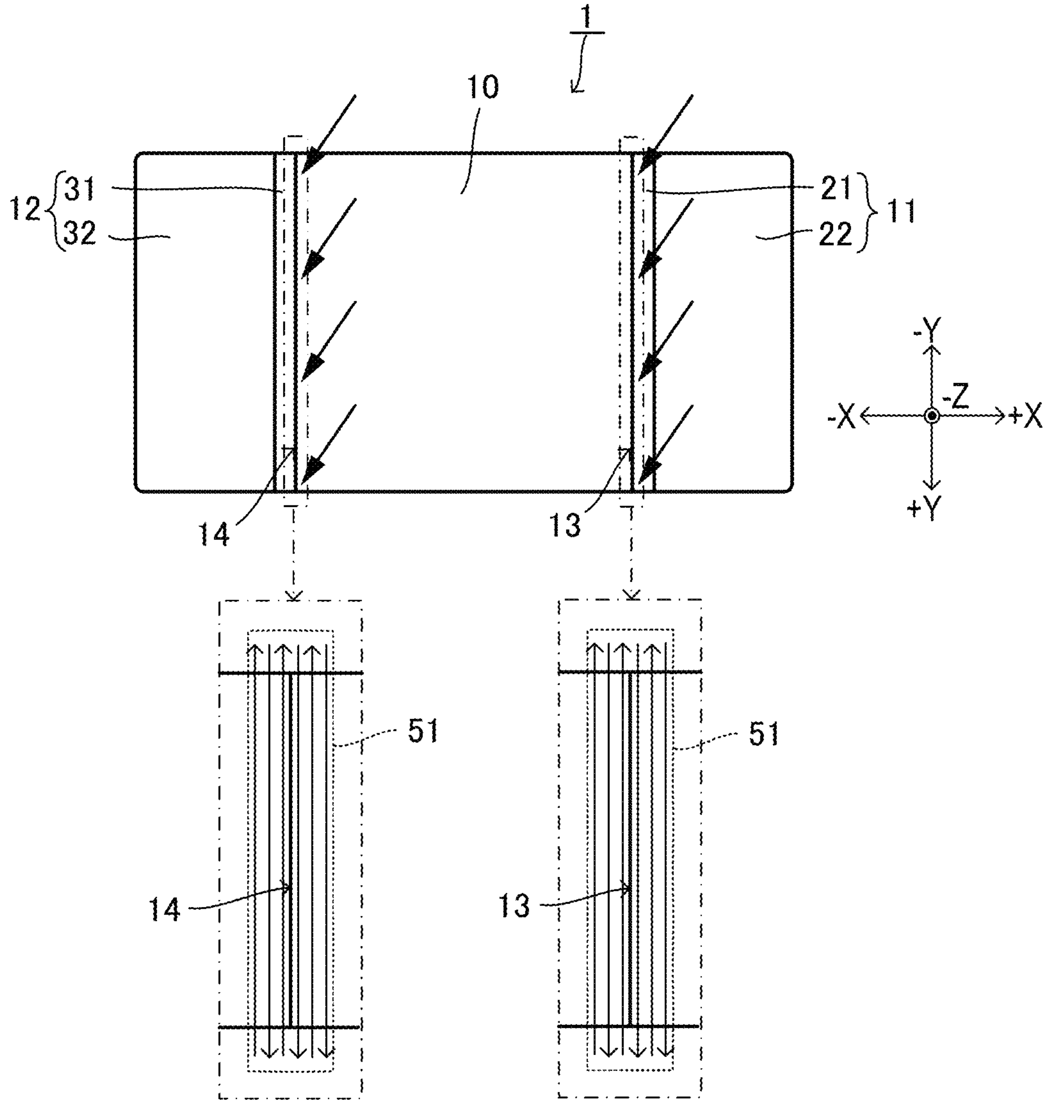
FIG. 8 is a schematic view in a case in which a trimming is performed on the resistor of the present embodiment.
Figure 9:
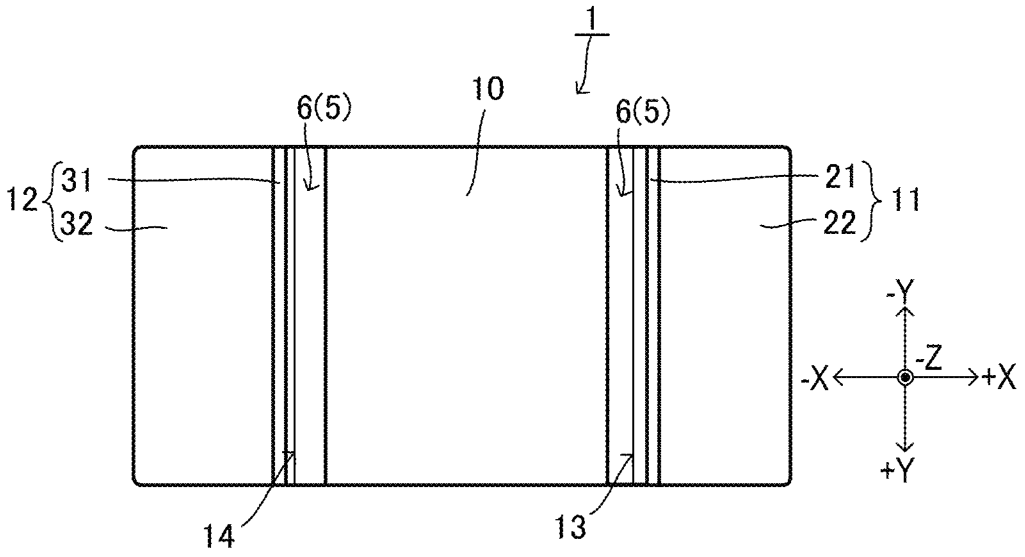
FIG. 9 is a diagram showing the mounting surface of the resistor after the trimming.
Figure 10:
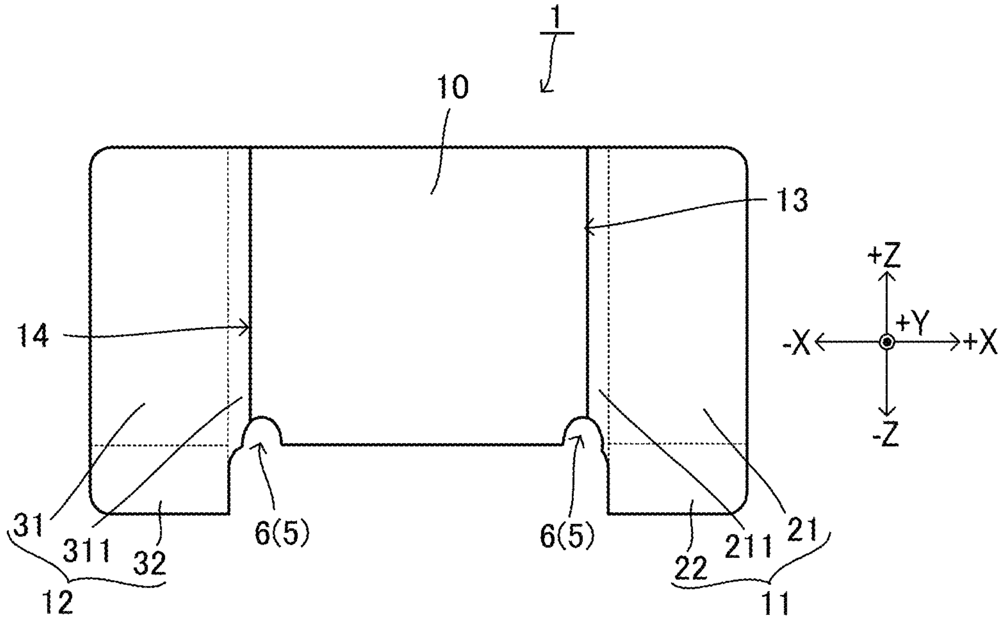
FIG. 10 is a side view of the resistor after the trimming.

FIG. 8 is a schematic view of a case in which a trimming is performed on the resistor 1 of the present embodiment. FIG. 9 is a diagram showing the mounting surface of the resistor 1 after the trimming. FIG. 10 is a side view of the resistor 1 after the trimming.

In the resistor 1 of the present embodiment, it is possible to adjust the resistance value by performing the trimming on the resistance body 10. The trimming is performed by irradiating laser beam onto the resistance body 10 to cut off a part of the resistance body 10. In addition, the above-described oxide film 5 is formed on the part of the resistance body 10 that has subjected to the trimming. Thus, by devising parts to be subjected to the trimming, it is possible to perform adjustment of the resistance value and processing for preventing the creeping of the solder at the same time. Although the irradiation of the laser is also performed when the oxide film 5 shown in FIGS. 3 to 6 is to be formed, an intensity of the laser is suppressed to a level that will not cause trimming in such a case.

As shown in FIG. 8, on the mounting surface of the resistor 1, the laser is irradiated to the bonded portion 13 and the bonded portion 14.

Incidentally, as described below (see FIGS. 11 and 12), the resistor 1 of the present embodiment is formed by inserting the resistor base material 100, which has been obtained by subjecting a resistance body base material 10A sandwiched between electrode body base materials 11A and 12A to the cladding (the solid phase bonding), through a die 300 such that the cross-sectional shape thereof is deformed to achieve the cross-sectional shape of the resistor 1 while reducing the cross-sectional area, and by cutting the resistor base material 100 that is obtained after being inserted through the die 300. Thus, although the bonded portion 13 (the boundary portion) and the bonded portion 14 (the boundary portion) are normally formed to have a flat surface (a straight line), they may be slightly curved. In such a case, it is difficult to focus only on the bonded portion 13 and the bonded portion 14 when the irradiation of the laser is to be performed.

Therefore, as shown in an enlarged view in FIG. 8, the laser is irradiated to the resistance body 10 and the first electrode body 11 on the bonded portion 13. At this time, an irradiation area 51 (the width in the X direction: 0.1 mm to 0.15 mm) of the laser is set such that the laser is to be irradiated to the resistance body 10 and the second electrode body 12 on the bonded portion 14.

As shown by arrows (tracing paths of irradiated positions of the laser) in the enlarged view in FIG. 8, for example, the laser is moved from a position on an end portion of the irradiation area 51 on the −X direction side, which is the position away from the resistor 1 when viewed in a planar view, towards the +Y direction, irradiated to the resistor 1, and is moved to the position away from the resistor 1 when viewed in a planar view. Subsequently, the laser is moved in the +X direction by a small distance (the moved distance is smaller than the spot size of the laser on the resistor 1), moved towards the −Y direction, irradiated to the resistor 1, and moved to the position away from the resistor 1 when viewed in a planar view. Thereafter, the operation is repeated in a similar manner to irradiate the laser to the entire surface of the irradiation area 51.

The output power of the laser is unstable and may become excessively high or low soon after occurrence of lasing. Thus, as described above, it is desirable that the lasing of the laser be started at the position away from the resistor 1 when viewed in a planar view (the position at which the laser is not irradiated to the resistor 1), and then, the laser, the output power of which has been stabilized, be irradiated to the resistor 1. In addition, it is desirable that the laser be irradiated from the end portion of the irradiation area 51 on the +Y direction (the −Y direction) side to the end portion on the −Y direction (the +Y direction) side without interruption.

In addition, the resistance value is not stable during the irradiation of the laser to the resistor 1, and so, the resistance value needs to be measured after the irradiation of the laser. Thus, the irradiation of the laser and the measurement of the resistance value will be repeated until the desired resistance value is achieved.

By irradiating the laser to the entire surfaces of the irradiation areas 51 as described above, recessed portions 6 are respectively formed so as to extend along the bonded portion 13 and the bonded portion 14 as shown in FIGS. 9 and 10. The recessed portions 6 are each formed to extend in the Y direction and to have a substantially semicircular cross-sectional shape when viewed from the Y direction (alternatively, rectangular or indefinite shape). By forming the recessed portions 6 as described above, the resistance value of the resistor 1 is shifted to the higher resistance side. In addition, by forming each recessed portion 6 from the end portion to the end portion of the irradiation area 51 as described above, the oxide film 5, which is a surface modified by a thermal reaction, is formed so as to be centered at an inner wall thereof, and therefore, it is possible to prevent the creeping of the solder up to the resistance body 10 at the reflowing step. Thus, for the resistance body 10 positioned between the pair of oxide films 5, even in a state in which the resistance body 10 forming a base material is exposed, there is no concern that the solder creeps up to the resistance body 10.

Modification

Figure 11:
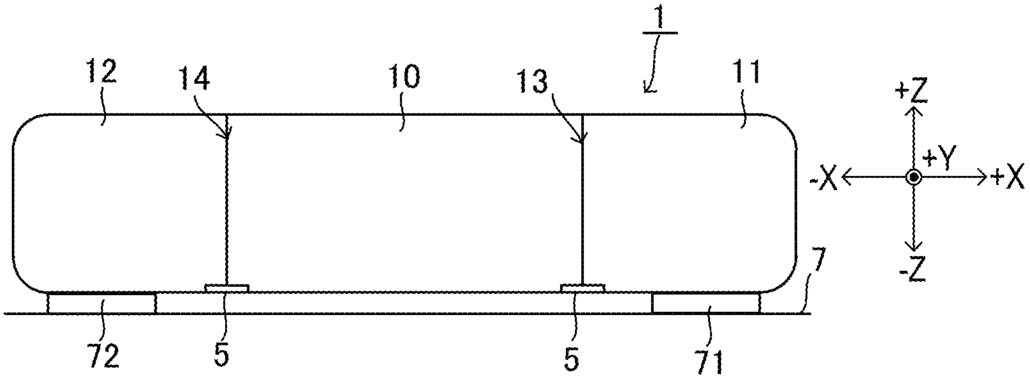
FIG. 11 is a diagram showing a modification of the resistor of the present embodiment.

FIG. 11 is a diagram showing a modification of the resistor 1 of the present embodiment. In the modification of the resistor 1 of the present embodiment, the leg portion 22 of the first electrode body 11 and the leg portion 32 of the second electrode body 12 are not provided, and the mounting surface of the resistor 1 is flat. On the other hand, electrodes 71 and 72 are arranged on the circuit board 7, and the electrodes 71 and 72 are arranged so as to project out from the circuit board 7. The first electrode body 11 is mounted on the electrode 71 with the solder (not shown), and the second electrode body 12 is mounted on the electrode 72 with the solder (not shown). At this time, the resistance body 10 is arranged so as to be separated away from the circuit board 7.

Similarly to the configuration described above, on the mounting surface of the resistor 1, the oxide films 5 are arranged so as to respectively cover the bonded portions 13 and 14, for example. Therefore, at the reflowing step, it is possible to prevent the solder that has flown along the first electrode body 11 from flowing beyond the oxide film 5 formed on the bonded portion 13 and creeping up to the resistance body 10. Furthermore, it is also possible to prevent the solder that has flown along the second electrode body 12 from flowing beyond the oxide film 5 formed on the bonded portion 14 and creeping up to the resistance body 10. In this modification, the recessed portion 6 (the oxide film 5) described above may also be formed.

Effect of Present Embodiment

Next, operational advantages of the present embodiment will be described.

According to the resistor 1 of the present embodiment, the resistor 1 is provided with the resistance body 10 and the pair of electrodes connected to the resistance body 10 (the first electrode body 11, the second electrode body 12), the resistance body 10 being arranged so as to be at least separated away from a substrate board (the circuit board) when mounted on the substrate board (the circuit board), wherein the resistor 1 has the oxide film 5 on at least one of the resistance body 10 and each of the electrodes (the first electrode body 11, the second electrode body 12) at the boundary portion (the bonded portion 13, the bonded portion 14) between the resistance body 10 and each of the electrodes (the first electrode body 11, the second electrode body 12) on the mounting surface of the resistor 1 (the mounting surface side).

With the above-described configuration, because the resistor 1 is configured of the resistance body 10 and the pair of electrodes (the first electrode body 11 and the second electrode body 12) connected to the resistance body 10, it is possible to realize the resistor 1 having a small size and a low resistance. In addition, the oxide film 5 has the low wettability to the solder. Thus, even if the gap between the resistance body 10 and the substrate board (the circuit board) is small, it is difficult for the solder to creep up because of the presence of the oxide film 5, and so, it is possible to prevent the solder from creeping up beyond the oxide film 5 and creeping up to the resistance body 10. Therefore, compared with a case in which the resistance body 10 is covered by a resin, it is possible to improve a manufacturing yield and to suppress a manufacturing cost.

In the present embodiment, the oxide film 5 is formed at least on the resistance body 10 (see FIGS. 3 and 5). With such a configuration, because the creeping of the solder reaches the bonding position (the bonded portion 13, the bonded portion 14) of the electrode (the first electrode body 11, the second electrode body 12) to the resistance body 10, the temperature variation of the TCR of the electrode (the first electrode body 11, the second electrode body 12) can be compensated effectively.

In the present embodiment, on the surface of the resistance body 10, the resistance body forming the base material is exposed except for the part formed with the oxide film 5. In other words, in a case in which the oxide film 5 is formed on the electrode (the first electrode body 11, the second electrode body 12) (see FIG. 4, etc.), the metal material that is the resistance body forming the base material is exposed on the surface of the resistance body 10. With such a configuration, it is possible to prevent the creeping of the solder up to the resistance body 10 without covering the surface of the resistance body 10, especially, the mounting surface of the resistance body 10, furthermore, for example, the mounting surface side of the side surfaces of the resistance body 10 with the resin.

In the present embodiment, the electrodes (the first electrode body 11, the second electrode body 12) each has the main body portion 21, 31 connected to the resistance body 10 and the leg portion 22, 32 protruded towards the substrate board (the circuit board), the boundary portion (the bonded portion 13, the bonded portion 14) being formed by the resistance body 10 and the main body portion 21, 31 (the protruded portion 211, 311), and the oxide film 5 is formed at least on the main body portion 21, 31 (see FIG. 4) at the boundary portion (the bonded portion 13, the bonded portion 14) between the resistance body 10 and the main body portion 21, 31 (the protruded portion 211, 311). With such a configuration, it is possible to prevent the creeping of the solder up to the resistance body 10 while ensuring the bonding between the leg portions 22 and 32 and the solder.

In the present embodiment, the resistor 1 has the recessed portion 6 at the boundary portion (the bonded portion 13, the bonded portion 14), and the oxide film 5 is formed in the recessed portion 6 or in the vicinity of the recessed portion 6 centered at the inner wall of the recessed portion 6. With such a configuration, it is possible to perform the adjustment of the resistance value and the processing for preventing the creeping of the solder at the same time.

In the present embodiment, the resistor 1 has the recessed portion 6 at the boundary portion (the bonded portion 13, the bonded portion 14), and the oxide film 5 is formed in the recessed portion 6 or in the vicinity of the recessed portion 6 centered at the inner wall of the recessed portion 6, the recessed portion 6 being formed so as to extend over both of the main body portion 21, 31 (the protruded portion 211, 311) and the resistance body 10. With such a configuration, it is possible to perform the adjustment of the resistance value and the processing for preventing the creeping of the solder at the same time and in a stable manner.

A manufacturing method of the resistor 1 of the present embodiment is a method for manufacturing the resistor 1 provided with the resistance body 10 and the pair of electrodes (the first electrode body 11 and the second electrode body 12) connected to the resistance body 10, the resistance body 10 being arranged so as to be at least separated away from the substrate board (the circuit board) when mounted on the substrate board (the circuit board), the method comprising a step of forming the oxide film 5 on at least one of the resistance body 10 and each of the electrodes (the first electrode body 11, the second electrode body 12) by irradiating the laser to the boundary portion (the bonded portion 13, the bonded portion 14) between the resistance body 10 and each of the electrodes (the first electrode body 11, the second electrode body 12) on the mounting surface side of the resistor 1.

With the above-described method, because the resistor 1 is configured of the resistance body 10 and the pair of electrodes (the first electrode body 11 and the second electrode body 12) connected to the resistance body 10, it is possible to realize the resistor 1 having a small size and a low resistance. In addition, the oxide film 5 has the low wettability to the solder. Thus, even if the gap between the resistance body 10 and the substrate board (the circuit board) is small, it is difficult for the solder to creep over the oxide film 5, and so, it is possible to prevent the solder from creeping up beyond the oxide film 5 and creeping up to the resistance body 10. Therefore, compared with a case in which the resistance body 10 is covered by a resin, it is possible to improve the manufacturing yield and to suppress the manufacturing cost.

Besides, the resistor 1 of the present embodiment has configurations, operations, and effects as described below.

According to the resistor 1 of the present embodiment, the resistor 1 is provided with the resistance body 10 and the pair of electrodes (the first electrode body 11 and the second electrode body 12) connected to the resistance body 10, the end surfaces of the resistance body 10 are respectively abutted to and bonded to the end surfaces of the electrodes (the first electrode body 11 and the second electrode body 12), the electrodes (the first electrode body 11 and the second electrode body 12) respectively include the main body portions 21 and 31 and the leg portions 22 and 32 respectively protruded from the main body portions 21 and 31 towards the mounting surface, the length dimension (L) of a long side of the resistor 1 is equal to or shorter than 3.2 mm, and the resistance value is equal to or lower than 2 mΩ.

With the above-described configuration, the leg portions 22 and 32 that respectively protrude from the main body portions 21 and 31 towards the mounting surface are configured by the resistance body 10 and the pair of electrodes (the first electrode body 11 and the second electrode body 12) connected to the resistance body 10. With such a configuration, because lines can be drawn out from sensing terminals between the leg portions 22 and 32, it is possible to realize the resistor 1 having the small size. In addition, because the electrodes (the first electrode body 11 and the second electrode body 12) are bonded on both ends of the resistance body 10, the dimension of the resistance body 10 (in the X direction) becomes smaller than the dimension of the resistor 1 (in the X direction). With such a configuration, it is possible to realize the resistor 1 having a lower resistance than resistors of the type in which the pair of electrodes are bonded to the lower surface of the resistance body 10. As described above, it is possible to obtain the resistor 1 capable of realizing further lower resistance (2 mΩ or lower), which has not been realized with general resistors, while realizing the smaller size (the long side dimension 3.2 mm or shorter, 3216 size or smaller).

In a case of a resistor that is formed by welding the resistance body and the electrode bodies by using, electron beam, etc., it is required to consider influence on the resistance value caused by the beads formed by the welding in a case of the resistor of this size scale. However, with the resistor 1 of the present embodiment, as described below, because the resistance body 10 can be bonded to the first electrode body 11, and the resistance body 10 can be bonded to the second electrode body 12 by the diffusion bonding, it is possible to stabilize properties such as the resistance value, etc. even if the resistor is designed to have such a small size.

In the present embodiment, in the mounting surface of the resistor 1, the boundary portions (the bonded portions 13 and 14) between the resistance body 10 and the respective main body portions 21 and 31 are flat. Because the welding beads caused by the electron beam welding, etc. are not formed, the boundaries between the resistance body 10 and the respective main body portions 21 and 31 become obvious, and so, it is possible to perform a judgement as being acceptable or defective with ease. In addition, when the resistor 1 is used as a shunt resistor, it is possible to suppress deterioration of the sensing accuracy of the current generated due to formation of the step at the boundaries between the resistance body 10 and the respective main body portions 21 and 31 (the bonded portions 13 and 14). Furthermore, it is possible to improve a stability of the resistance value and a thermal property.

In the present embodiment, the resistance body 10 is bonded to the main body portions 21 and 31 by the solid phase bonding. Thus, the resistance body 10 and the first electrode body 11 are firmly bonded with each other, and the resistance body 10 and the second electrode body 12 are firmly bonded with each other, and therefore, a good electrical property can be obtained. In addition, in the resistor 1, the electron beam welding, etc., is not used for the bonding between the resistance body 10 and the first electrode body 11 and the bonding between the resistance body 10 and the second electrode body 12, and therefore, the bonded portions 13 and 14 do not have the welding beads (a welding mark having an irregular shape). Therefore, a bondability is not deteriorated even in a case in which wire bonding, etc. is performed on the surface of the resistor 1.

In the present embodiment, the main body portions 21 and 31 respectively have the protruded portions 211 and 311 protruded towards the resistance body side. With such a configuration, when the length (L) of the resistor 1 in the longitudinal direction (the X direction) is set constant, by arbitrarily adjusting the length of the protruded portion 211 in the X direction (the length L1 of the main body portion 21) or the length of the protruded portion 311 in the X direction (the length L2 of the main body portion 31 in the X direction), it is possible to adjust the length (L0) of the resistance body 10 in the X direction so as to satisfy L0=L−(L1+L2). Therefore, it is possible to arbitrarily adjust the resistance value of the resistor 1 without changing the shapes of the leg portions 22 and 32.

In the present embodiment, in the direction in which the resistance body 10 and the electrodes (the first electrode body 11 and the second electrode body 12) of the resistor 1 are arranged (the X direction), end portions of the leg portions 22 and 32 on the mounting surface side each has the chamfered shape.

In general resistors, the resistors tend to be damaged due to occurrence of a phenomenon called an electromigration that is caused as a current density is increased in a non-chamfered corner portion, or due to concentration of thermal stress to such a corner portion in a similar manner. In addition, because the electromigration has a non-negligible influence as the circuit size is decreased, there was a concern that the smaller the resistor is, the more pronounced the electromigration becomes.

In contrast, in the resistor 1, because the corner portions P are chamfered, deviation of the current density in the corner portions P is reduced. Thus, it is possible to suppress occurrence of the electromigration. In addition, in a similar manner, because the concentration of the thermal stress can be reduced, it is possible to improve a heat cycle resistance.

In the present embodiment, the direction orthogonal to the direction in which the resistance body 10 and the electrodes (the first electrode body 11 and the second electrode body 12) of the resistor 1 are arranged (the X direction) as well as to the mounting direction of the resistor 1 (the Z direction) is set as the width direction (the Y direction), and the surface of the resistance body 10 and/or the surfaces of the electrodes (the first electrode body 11 and the second electrode body 12) is/are formed with the stripe-patterned grooved and ridged surface (the stripe-patterned grooves and ridges 15) extending in the width direction (the Y direction). With such a configuration, the surface area of the resistor 1 can be increased to improve the heat radiation property, and in addition, when the grooves and ridges are formed on the electrodes (the first electrode body 11 and the second electrode body 12), it is possible to increase a bonding strength for a solder for fixing the resistor 1 to the circuit board.

In the present embodiment, the resistance body 10 is formed to have the cuboid shape (or the cube shape). In a case in which the resistance body 10 has the cuboid shape (or the cube shape), the first electrode body 11 and the second electrode body 12 are respectively formed to have substantially the same shapes as the end surfaces of the resistance body 10 and are respectively bonded to the end surfaces of the resistance body 10, and a path of the current flowing from the first electrode body 11 and the second electrode body 12 through the resistance body 10 is formed linearly, and therefore, it is possible to stabilize the resistance value. In addition, in the resistor 1, because the resistance body 10 is bonded between the first electrode body 11 and the second electrode body 12, it is possible to adjust the resistance value while setting the volume of the resistance body 10 to the minimum required volume.

Explanation of Manufacturing Method of Resistor

Figure 12:
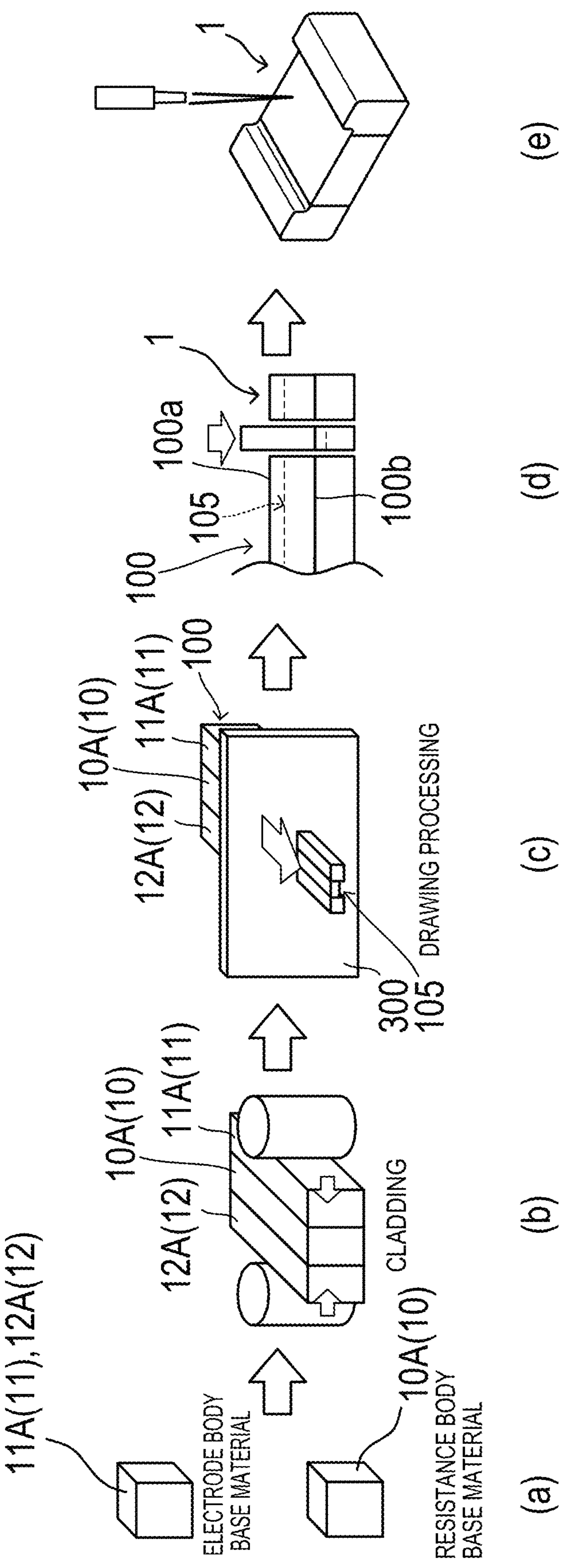
FIG. 12 is a schematic view for explaining a manufacturing method of the resistor of the present embodiment.

FIG. 12 is a schematic view for explaining the manufacturing method of the resistor 1 of the present embodiment.

The manufacturing method of the resistor 1 of the present embodiment includes: Step (a) of preparing materials; Step (b) of bonding the materials; Step (c) of processing the shape; Step (d) of cutting out individual resistors 1 (separation into pieces); and Step (e) of adjusting the resistance value of the resistor 1 by using a laser.

In Step (a) of preparing the materials, a resistance body base material 10A serving as a base material of the resistance body 10, an electrode body base material 11A serving as the base material of the first electrode body 11, and an electrode body base material 12A serving as the base material of the second electrode body 12 are prepared. The resistance body base material 10A and the electrode body base materials 11A and 12A are each a long wire rod having a flat rectangular shape. In the present embodiment, from the view point of the size, the resistance value, and a processability of the resistor 1, it is preferable to use a copper-manganese alloy as the material of the resistance body base material 10A (the resistance body 10) and to use the oxygen-free copper (C1020) as the material of the electrode body base materials 11A and 12A (the first electrode body 11 and the second electrode body 12).

In Step (b) of bonding the materials, the electrode body base material 11A, the resistance body base material 10A, and the electrode body base material 12A are stacked in this order, and the materials are bonded by applying pressure in the stacked direction, and thereby, the resistor base material 100 is formed.

In other words, in Step (b), a so-called cladding (the solid phase bonding) between dissimilar metal materials is performed. The bonded surface between the electrode body base material 11A and the resistance body base material 10A subjected to the cladding, and the bonded surface between the electrode body base material 12A and the resistance body base material 10A subjected to the cladding are each the diffusion bonded surface in which metal atoms from both materials are diffused to each other.

Thus, it is possible to perform firm mutual bonding at the bonded surface between the resistance body base material 10A and the electrode body base material 11A and at the bonded surface between the resistance body base material 10A and the electrode body base material 12A, without performing a common electron beam welding. In addition, a good electrical property is obtained at the bonded surface between the resistance body base material 10A (the resistance body 10) and the electrode body base material 11A (the first electrode body 11) and at the bonded surface between the resistance body base material 10A (the resistance body 10) and the electrode body base material 12A (the second electrode body 12).

Figure 13:
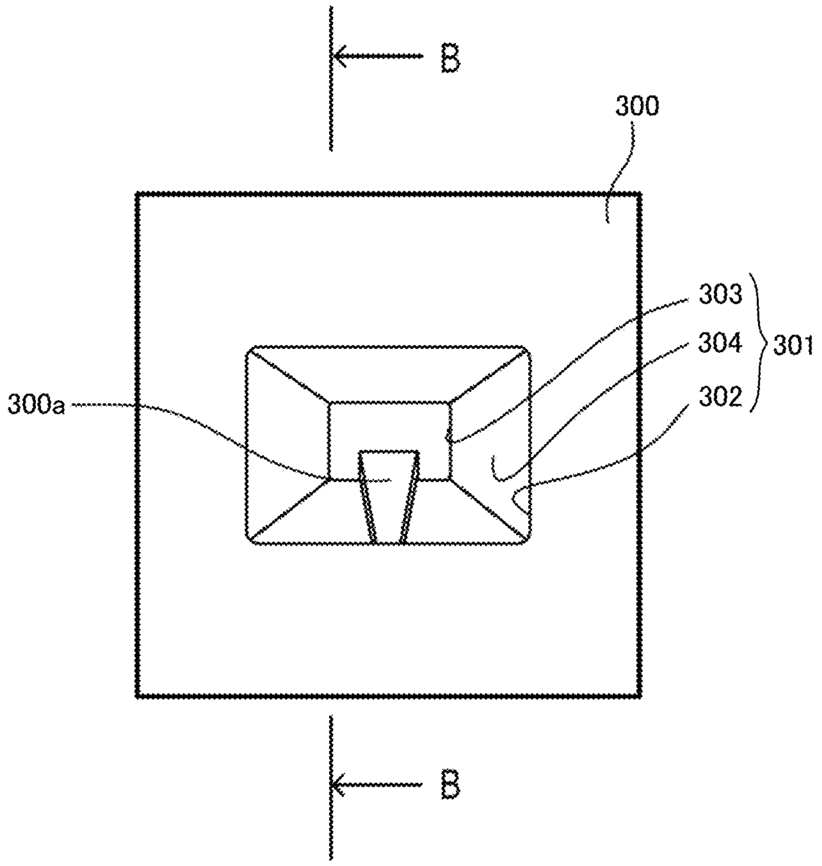
FIG. 13 is a front view of a die used in Step (c) shown in FIG. 12, viewed from the upstream side in the drawing direction F.
Figure 14:
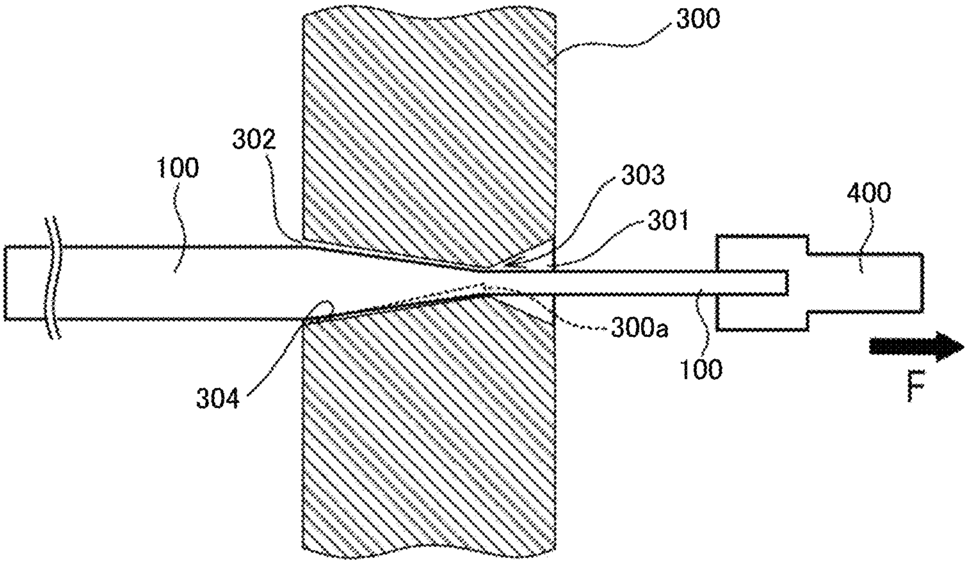
FIG. 14 is a sectional view taken along line B-B in FIG. 13 and is a schematic view for explaining a step of processing a shape of the resistor of the present embodiment in a manufacturing method.

FIG. 13 is a front view of a die 300 used in Step (c) shown in FIG. 12 viewed from the upstream side in the drawing direction F. FIG. 14 is a sectional view taken along line B-B in FIG. 14 and is a schematic view for explaining the step of processing the shape in the manufacturing method of the resistor 1 of the present embodiment. In Step (c), the resistor base material 100 obtained by the cladding is passed through the die 300. When the resistor 1 of the present embodiment is to be manufactured, as one example, it is possible to use the die 300 shown in FIG. 13.

An opening portion 301 is formed in the die 300. The opening portion 301 has an inlet opening 302 that is set to have the dimension that allows the insertion of the resistor base material 100, an outlet opening 303 that is set to have the dimension smaller than the outer dimension of the resistor base material 100, and an insertion portion 304 that is formed to have a tapered shape from the inlet opening 302 towards the outlet opening 303. In the present embodiment, the opening portion 301 is formed to have a rectangular shape in which corner portions are processed to have the chamfered shapes.

By passing the resistor base material 100 through the die 300 having such a shape, it is possible to compressively deform the resistor base material 100 from all directions. Thus, a cross-sectional shape of the resistor base material 100 is processed to the shape that imitates the outer shape of the die 300 (the outlet opening 303).

In addition, in the present embodiment, in Step (c), when the resistor base material 100 is passed through the die 300, a drawing method in which the resistor base material 100 is drawn out by a holding tool 400 is applied.

In Step (c), it may be possible to perform a drawing processing by preparing a plurality of dies 300 respectively having the opening portions 301 with different sizes and by passing the resistor base material 100 through the plurality of dies 300 in a consecutive manner.

In addition, in Step (c), by changing the shape of the opening portion 301 of the die 300, it is possible to manufacture the resistor 1 of the present embodiment.

When the resistor 1 is to be manufactured, as one example, the die 300, in which a protruded portion 300*a* having a rectangular shape protruded towards the center of the opening is formed on a part of one side of the opening portion 301 (the inlet opening 302, the outlet opening 303), is applied. Because of the protruded shape provided on the rectangular outlet opening 303, a rectangular groove 105 extending continuously in the drawing direction is formed in the resistor base material 100.

As the resistor base material 100 is cut into separate pieces, the rectangular groove 105 forms a recessed portion that is surrounded by the resistance body 10, the main body portion 21 and the leg portion 22 of the first electrode body 11, and the main body portion 31 and the leg portion 32 of the second electrode body 12.

Returning to FIG. 12, in Step (d) following Step (c), the resistor 1 is cut out from the resistor base material 100 so as to achieve the length W in the Y direction as designed. In addition, in the present embodiment, in Step (d), it is preferred that the resistor base material 100 be cut from a surface 100*a* of the resistor base material 100, in which the rectangular groove 105 is formed, towards an opposite surface 100*b*. By doing so, a burr of the metal is formed to have a shape that extends upwards from the upper surface of the resistor 1, and the burr extending in the −Z direction (FIGS. 1 and 2) (the burr extending towards a circuit substrate) is not formed on the leg portions 22 and 32. By doing so, it is possible to surely perform mounting of the resistor 1 onto the circuit board.

By following the above-described steps, it is possible to obtain an individual piece of the resistor 1 from the resistor base material 100. Furthermore, in Step (e), the resistance value of the resistor 1 is set at a desired resistance value by performing the trimming of the resistance body 10 by irradiating laser. A detail of the trimming is as described above (see FIGS. 8 to 10).

The corner portions P shown in FIGS. 1 and 2 are formed so as to imitate the shape of the opening portion 301 of the die 300, and the stripe-patterned grooves and ridges 15 are a stripe-patterned sliding mark formed so as to extend in the length-wise direction of the resistor base material 100 when the resistor base material 100 is slid in a state in which the resistor base material 100 is compressed against an inner wall of the die 300 (the outlet opening 303).

Effect of Manufacturing Method of Resistor 1 Using Die 300 according to Present Embodiment Next, operational advantages of the present embodiment will be described.

According to the manufacturing method of the resistor 1 using the die 300 of the present embodiment, the pressure is applied after stacking the electrode body base material 11A, the resistance body base material 10A, and the electrode body base material 12A in parallel, and the cladding (the solid phase bonding) is performed, and thereby, the resistor base material 100 (the resistor 1) having an integrated structure (in other words, a parallel structure) is obtained. Thus, without using the electron beam welding, etc., it is possible to increase the bonding strength between the resistance body base material 10A (the resistance body 10) and the electrode body base material 11A (the first electrode body 11) and the bonding strength between the resistance body base material 10A (the resistance body 10) and the electrode body base material 12A (the second electrode body 12).

In addition, according to the above-described manufacturing method of the present embodiment, by compressing the resistor base material 100 from all directions by passing it through the die 300, it is possible to form the external shape of the resistor base material 100. Therefore, after the resistor base material 100 is formed, it is possible to manufacture the individual resistor 1 only by performing Step (d). Therefore, it is possible to suppress individual differences caused by the manufacture of the resistor 1. In addition, by passing the resistor base material 100 through the die 300, it is possible to further increase the bonding strength between the resistance body 10 and the first electrode body 11 and the bonding strength between the resistance body 10 and the second electrode body 12.

As a method to compress the resistor base material 100 from all directions, if the resistor base material 100 is of a square shape, for example, there has been a method in which the resistor base material 100 is subjected to a first pressure welding by using a pair of rollers that apply the pressure in the thickness direction (Z), and thereafter, the resistor base material 100 is subjected to a second pressure welding by using a pair of rollers that apply the pressure in the width direction (Y).

However, with such a method, in the first pressure welding step, although the resistor base material 100 is compressed in the thickness direction (Z), the resistor base material 100 is expanded in the width direction (Y). In addition, in the following second pressure welding step, although the resistor base material 100 is compressed in the width direction (Y), the resistor base material 100 is expanded in the thickness direction (Z). As a result, the dimensional accuracy is deteriorated, and individual variation for the resistor, variation in a temperature distribution when power is applied to the resistor, and so forth are increased.

In contrast, according to the above-described manufacturing method in the present embodiment, by performing the drawing step in which the resistor base material 100 is passed through the die 300, it is possible to uniformly compress the resistor base material 100 in the length-wise direction (X) and in the thickness direction (Z).

Therefore, compared with a resistor base material obtained by repeating the compression from one direction and the compression from the other direction by using the rollers, it is considered that an electrically advantageous bonding interface is formed in the resistor base material 100. Therefore, it is possible to suppress differences in properties for the resistor 1 as an end product.

With the above-described manufacturing method according to the present embodiment, especially, by using the plurality of dies 300 respectively having the opening portions 301 of different types in a consecutive manner, a compression forming is performed such that the size of the resistor base material 100 is reduced in a consecutive manner. By doing so, it is possible to uniformly compress the resistor base material 100 in the length-wise direction (X) and the thickness direction (Z) while reducing a load to the resistor base material 100 and the die 300. Thus, it is possible to suppress the variations in properties for the resistor 1 as the end product.

In addition, with the above-described manufacturing method according to the present embodiment, in Step (c) in which the resistor base material 100 is passed through the die 300, by applying the drawing step, it is possible to increase the accuracy of the end product compared with an extruding method. By using this manufacturing method, it is possible to realize a stabilization of the properties as the resistor 1.

Especially, at least the outlet opening 303 of the opening portion 301 of the die 300 is formed with continuous curves. With such a configuration, it is possible to relieve a stress imparted to the resistor base material 100 while the resistor base material 100 is being passed through the opening, and so, it is possible to reduce the load to the resistor base material 100 and the die 300. Thus, it is possible to suppress the variations in properties for the resistor 1 as the end product.

In addition, because at least the outlet opening 303 is formed with the continuous curves, the corner portions P (the edge sides) of the resistor 1, which are obtained by being passed through the die 300, are chamfered. Thus, it is possible to suppress the electromigration caused in the resistor 1 at the corner portions P. In addition, it is possible to increase the heat cycle resistance of the resistor 1.

In addition, according to the above-described manufacturing method of the present embodiment, because the first electrode body 11, the resistance body 10, and the second electrode body 12 are mutually bonded by the diffusion bonding (the solid phase bonding), the welding beads are not formed. When the bonding is performed by the welding, such as the common electron beam welding, etc., there may have been a risk in that, as the size of the resistor is reduced, the non-negligible influence is imparted to the resistance value property by the welding beads. However, there is no such a concern for the resistor 1 obtained by the above-described manufacturing method according to the present embodiment.

As described above, in the above-described manufacturing method according to the present embodiment, the resistor base material 100 is obtained by cladding (the solid phase bonding) the resistance body base material 10A and the electrode body base materials 11A and 12A, and the resistor base material 100 is passed through the die 300 to perform the forming. Thus, because the bonding strength between the materials can be increased without employing the electron beam welding for example, and at the same time, because the high dimensional accuracy can be ensured, the manufacturing method is suitable for the manufacture of the small resistor 1.

When the resistor 1 is to be manufactured, in Step (d), it is preferred that the resistor base material 100 be cut from the surface 100*a* of the resistor base material 100, in which the rectangular groove 105 is formed, towards the opposite surface 100*b*. By doing so, it is possible to prevent, at the mounting surface side, the formation of the burr caused by the cutting.

In addition, in the above-described manufacturing method according to the present embodiment, before performing Step (c) of processing the shape, a step of adjusting the size of the resistor base material 100, which has been subjected to the cladding, to the size that allows the insertion into the die 300 may be performed.

In addition, in the above-described manufacturing method according to the present embodiment, although the irradiation of the laser is used for the formation of the oxide film 5, there is no intention to limit the means of forming the oxide film 5 to the laser as long as it is possible to form the oxide film 5 by modifying a metal surface, and for example, the oxide film 5 may be formed by supplying an oxidizing agent.

Although the embodiments of the present disclosure have been described in the above, the above-mentioned embodiments merely illustrate a part of application examples of the present disclosure, and the technical scope of the present disclosure is not intended to be limited to the specific configurations in the above-mentioned embodiments. For example, in the present embodiment, although a description has been given of the resistor 1 that is obtained by passing the resistor base material 100 through the die 300 and by separating it into individual pieces, the present disclosure may also be applied to the resistor that is obtained by cladding the resistance body and the electrode bodies without passing them through the die 300 or to the resistor that is formed by press working.

The present application claims a priority based on Japanese Patent Application No. 2020-011196 filed on Jan. 27, 2020 in the Japan Patent Office, the entire contents of which are incorporated herein by reference.

The invention claimed is:

1. A resistor comprising a resistance body and a pair of electrodes connected to the resistance body, the resistance body being arranged so as to be at least separated away from a substrate board when mounted on the substrate board, wherein the resistance body and each of the electrodes are directly bonded with each other, and the resistor has an oxide film due to oxidation of the resistance body or the electrode on at least one surface of the resistance body and each of the electrodes at a boundary portion between the resistance body and each of the electrodes on a mounting surface of the resistor.

2. The resistor according to claim 1, wherein the oxide film is formed at least on the resistance body.

3. The resistor according to claim 1, wherein a surface of the resistance body is exposed except for a part formed with the oxide film.

4. The resistor according to claim 1, wherein the electrodes each has a main body portion connected to the resistance body and a leg portion protruded towards the substrate board, the boundary portion being formed by the resistance body and the main body portion, and the oxide film is formed at least on the main body portion at the boundary portion between the resistance body and the main body portion.

5. The resistor according to claim 1, wherein the resistor has a recessed portion at the boundary portion, and the oxide film is formed in the recessed portion.

6. The resistor according to claim 4, wherein the resistor has a recessed portion at the boundary portion, and the oxide film is formed in the recessed portion, the recessed portion being formed so as to extend over both of the main body portion and the resistance body.

7. A manufacturing method of a resistor provided with a resistance body and a pair of electrodes connected to the resistance body, the resistance body being arranged so as to be at least separated away from a substrate board when mounted on the substrate board, the manufacturing method comprising:

a step of directly bonding the resistance body and each of the electrodes with each other, the directly bonding being a solid layer bonding, and a step of forming an oxide film by irradiating laser on at least one surface of the resistance body and each of the electrodes at a boundary portion between the resistance body and each of the electrodes on a mounting surface of the resistor.

* * * * *